(12) United States Patent
Aldenfalk Jansson

(10) Patent No.: US 12,365,067 B2
(45) Date of Patent: Jul. 22, 2025

(54) DETECTING TIGHTENING TOOL PERFORMANCE DETERIORATION

(71) Applicant: ATLAS COPCO INDUSTRIAL TECHNIQUE AB, Stockholm (SE)

(72) Inventor: Staffan Aldenfalk Jansson, Solna (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/703,057

(22) PCT Filed: Sep. 19, 2022

(86) PCT No.: PCT/EP2022/075964
§ 371 (c)(1),
(2) Date: Apr. 19, 2024

(87) PCT Pub. No.: WO2023/072480
PCT Pub. Date: May 4, 2023

(65) Prior Publication Data
US 2024/0335926 A1    Oct. 10, 2024

(30) Foreign Application Priority Data

Oct. 26, 2021   (SE) .................................. 2130288-0

(51) Int. Cl.
*B25B 23/147* (2006.01)
*B25B 21/00* (2006.01)
(Continued)

(52) U.S. Cl.
CPC .............. *B25B 23/147* (2013.01); *G01B 5/00* (2013.01)

(58) Field of Classification Search
CPC ..... B25B 23/147; B25B 23/142; B25B 23/14; B25B 23/1422; B25B 23/1475;
(Continued)

(56) References Cited

U.S. PATENT DOCUMENTS 4,768,388 A * 9/1988 Fader ................... B25B 23/142
                                                                                 73/761
2010/0170369 A1    7/2010 Yokoyama et al.
(Continued)

FOREIGN PATENT DOCUMENTS

GB         1591351 A     6/1981
WO      03101322 A1    12/2003

OTHER PUBLICATIONS

Atlas Copco Industrial Technique AB, International Patent Application No. PCT/EP2022/075964, International Search Report, Jan. 17, 2023.
(Continued)

*Primary Examiner* — Jeffrey P Aiello
(74) *Attorney, Agent, or Firm* — Moore & Van Allen PLLC; W. Kevin Ransom

(57) ABSTRACT

The present disclosure relates to a method of detecting an indication of a tightening tool deteriorating in tightening performance, and a control device performing the method. In a first aspect, a method of detecting an indication of a tightening tool deteriorating in tightening performance is provided. The method comprises acquiring at least one set of observed values of a torque having been applied by the tightening tool to an object to be tightened over a first time period, determining whether or not an overshoot metric of the observed values in the at least one acquired set with respect to a target torque exceeds a predetermined overshoot threshold value, and if so providing an alert that an indication of performance deterioration of the tightening tool has been detected.

15 Claims, 10 Drawing Sheets

(51) Int. Cl.
*B25B 23/145* (2006.01)
*G01B 5/00* (2006.01)

(58) Field of Classification Search
CPC ............ B25B 23/1427; B25B 23/1456; B25B 23/1405; B25B 21/00; B25B 21/02; G01B 5/00; B23P 19/066; G05B 2219/49181; G05B 2219/37245; G05B 23/0221; G05B 19/4065

USPC ........... 33/784; 73/761, 862.23, 862.24, 660, 73/1.09, 114.11; 700/37; 702/41, 43, 702/182, 34, 105, 185, 42, 183, 33, 35, 702/116, 181

See application file for complete search history.

(56) References Cited

U.S. PATENT DOCUMENTS

| | | | |
|---|---|---|---|
| 2013/0112049 A1* | 5/2013 | Lawton | B25B 23/1425 81/429 |
| 2019/0283223 A1* | 9/2019 | Danebergs | B25B 23/1425 |
| 2020/0150615 A1* | 5/2020 | Jousset | B25B 21/004 |
| 2021/0191357 A1* | 6/2021 | Jousset | B25B 23/14 |
| 2021/0199416 A1* | 7/2021 | Boisard | G05B 19/4065 |

OTHER PUBLICATIONS

Atlas Copco Industrial Technique AB, International Patent Application No. PCT/EP2022/075964, Written Opinion, Jan. 17, 2023.
Atlas Copco Industrial Technique AB, International Patent Application No. PCT/EP2022/075964, International Preliminary Report on Patentability, Jan. 17, 2024.
Atlas Copco Industrial Technique AB, Swedish Patent Application No. 2130288-0, Swedish Search Report, Jun. 29, 2022.

* cited by examiner

DETECTING TIGHTENING TOOL PERFORMANCE DETERIORATION

CROSS-REFERENCE TO RELATED APPLICATIONS

This application is a National Stage Patent Application (filed under 35 § U.S.C. 371) of PCT/EP2022/075964, filed Sep. 19, 2022 of the same title, which, in turn claims priority to Swedish Patent Application No. 2130288-0 filed Oct. 26, 2021 of the same title; the contents of each of which are hereby incorporated by reference.

TECHNICAL FIELD

The present disclosure relates to a method of detecting an indication of a tightening tool deteriorating in tightening performance, and a control device performing the method.

BACKGROUND

In industrial applications, various types of tools are utilized for facilitating and aiding work.

For instance, automated tightening tools may be employed for tightening bolts and nuts in an industrial environment such as a vehicle service station. In such environment, these tools may be an absolute necessity for providing sufficiently high quality in the tightening process.

In order to ensure adequate performance of such tool, maintenance of the tool is occasionally required according to a predetermined schedule, such as once every 12 months or after having performed 250,000 tightening operations. As an example, the maintenance may involve application of lubrication to a rotating joint of the tool.

A problem in the art is that for a given population of the tool, a few individual tools may require service before the scheduled maintenance. This may require a tool to prematurely be taken out of production for maintenance, thereby causing interruptions and delay which typically is costly. In a more severe scenario, not only may the performance of the tool decrease thereby showing signs of requiring service; the tool may even stop functioning and have to be replaced.

SUMMARY

One objective is to solve, or at least mitigate, this problem and thus to provide a method of detecting an indication of a tightening tool deteriorating in tightening performance.

This objective is attained in a first aspect by a method of detecting an indication of a tightening tool deteriorating in tightening performance. The method comprises acquiring at least one set of observed values of a torque having been applied by the tightening tool to an object to be tightened over a first time period, determining whether or not an overshoot metric of the observed values in the at least one acquired set with respect to a target torque exceeds a predetermined overshoot threshold value, and if so providing an alert that an indication of performance deterioration of the tightening tool has been detected.

This objective is attained in a second aspect by a control device configured to detect an indication of a tightening tool deteriorating in tightening performance, the control device comprising a processing unit and a memory containing instructions executable by the processing unit, whereby the control device is operative to acquire at least one set of observed values of a torque having been applied by the tightening tool to an object to be tightened over a first time period, determine whether or not an overshoot metric of the observed values in the at least one acquired set with respect to a target torque exceeds a predetermined overshoot threshold value, and if so to provide an alert that an indication of performance deterioration of the tightening tool has been detected.

Thus, by acquiring a set of observed torque values pertaining to, say, a 24-hour period of operation of the tightening tool and determining an overshoot metric of the torque values with respect to a target torque to be applied by the tool, it is advantageously possible to make an assessment as to whether or not the overshoot metric indicates that there is a deterioration in performance of the tightening tool.

The acquired set of torque values, which may contain hundreds or even thousands of observed values for a 24-hour time period, would typically form a one-sided normal distribution starting at the target torque. Such a distribution will have an expected mean value, median value or standard deviation for a fully functioning tool. If an overshoot metric, e.g. the mean value, of the observations in the set would increase such that an appropriately set torque threshold value is exceeded, a deterioration in performance of the tool is considered to have been detected.

In embodiments, the alert is provided to an operator of the tightening tool e.g. as an audible and/or visual alert via a display of the tool, to the tightening tool itself, to a supervision control room or to a remote cloud function.

It is envisaged that the control device detecting the deterioration in tightening performance may be arranged inside the tightening tools or being externally attached to a housing of the tool.

However, the control device may alternatively be embodied by a device being external from the tightening tool, such as for instance a remotely located computational device such as a cloud server/function being in communication with the tool for acquiring the observed torque values.

In an embodiment, at least one further set of observed values of a torque having been applied by the tightening tool to an object to be tightened is acquired for a second subsequent time period, such as during a next 24 hours. Thereafter, it is determined whether or not the overshoot metric of the observed values in the at least one further acquired set exceeds the predetermined overshoot threshold value. Finally, it is determined whether or not a required number of acquired sets has been reached where the overshoot metric exceeds the predetermined overshoot threshold value, and if so the alert is provided that an indication of performance deterioration of the tightening tool has been detected.

Advantageously, this avoids a scenario where a premature alert of a deterioration in performance is provided in case e.g. the first set of observed are subjected to natural variations.

In an embodiment, in order to keep track of the number of sets where the overshoot metric exceeds the threshold value, a counter is incremented each time the overshoot metric of the observed values in an acquired set is determined to exceed the predetermined overshoot threshold value for determining if the required number of acquired sets has been reached. It may be envisaged that sets of several days must have an overshoot metric exceeding the predetermined overshoot threshold value for an alert to be provided.

In an embodiment, the counter is decremented each time the overshoot metric of the observed values in an acquired set is determined not to exceed the predetermined overshoot threshold value.

In an embodiment, a measure is assigned to each acquired set of observed values indicating a degree of overshoot of the set of observed torque values with respect to the predetermined overshoot threshold value. Thus, a large overshoot for an acquired set of observed torque values is penalized harder than a smaller overshoot. A (very) large overshoot indeed may indicate that there is a performance deterioration problem that should be alerted instantly.

In an embodiment, the assigned overshoot measure of a currently acquired set is accumulated with the overshoot measure assigned to an immediately preceding acquired set to form an anomaly score, where for each subsequent set the assigned overshoot measure is recursively accumulated with the anomaly score, and it is thereafter determined whether or not a required anomaly score has been reached. If so, the alert that an indication of performance deterioration of the tightening tool has been detected is provided.

Again, this embodiment is advantageous since a scenario is avoided where a premature alert of a deterioration in performance is provided. Typically, a plurality of overshoot measures must be recursively accumulated in order to form a sufficiently high anomaly score.

In an embodiment, for each acquired set where the overshoot metric of the observed values is determined not to exceed the predetermined overshoot threshold value, the overshoot measure is assigned as a negative number, with a boundary condition that a minimum value of the anomaly score is zero.

In an embodiment, the alert is further configured to comprise an indication of time since a last tool maintenance session was performed and/or how many tightening operations have been performed by the tightening tool since a last tool maintenance session was performed. Advantageously, this may assist an operator in planning maintenance sessions for the tool.

In an embodiment, the control device is operative to acquire the sets of observed values of a torque having been applied by the tightening tool from a torque measurement sensor of the tightening tool.

In an embodiment, the control device further comprises a communication interface via which data may be transmitted and/or received via wire or by wireless communication. For instance, the control device may wirelessly communicate observed torque data to the hereinabove mentioned supervision control room or to the remotely located cloud function/server.

In a third aspect, a computer program is provided comprising computer-executable instructions for causing the tightening tool to perform steps recited in the method of the first aspect when the computer-executable instructions are executed on a processing unit included in the tightening tool.

In a fourth aspect, a computer program product comprising a computer readable medium, the computer readable medium having the computer program of the third aspect embodied thereon.

Further embodiments will be described in the detailed description in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
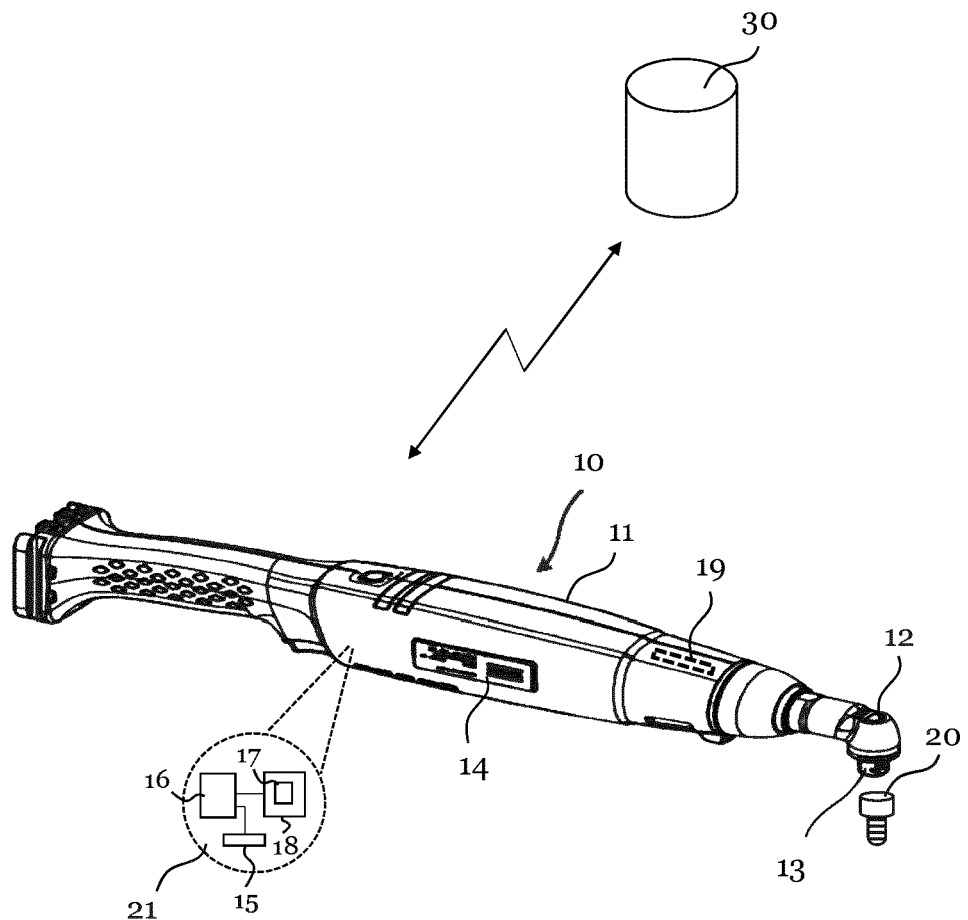
FIG. 1 illustrates a tightening tool configured to apply a torque to a fastener, in which tool embodiments may be implemented.

FIG. 1 illustrates a tool in the form of a tightening tool 10 configured to apply a torque to a fastener such as a bolt 20, in which tool embodiments may be implemented.

The tightening tool 10 may be cordless or electrically powered via a cord and has a main body 11 and a tool head 12. The tool head 12 has an output shaft 13 configured to be rotatably driven by an electric motor arranged inside the main body 11 to apply the torque to the bolt 20.

The tightening tool 10 may be arranged with a display 14 via which an operator of the tool 10 may be presented with information relating to operation of the tool 10.

The tightening tool 10 may further be arranged with communicating capability in the form of a radio transmitter 15 for wirelessly transmitting operational data, such as applied torque, to a remotely located device such as a cloud server 30.

The steps of the method to be described in the following as performed by the tool 10 are in practice performed by a control device 21 comprising a processing unit 16 embodied in the form of one or more microprocessors arranged to execute a computer program 17 downloaded to a storage medium 18 associated with the microprocessor, such as a Random Access Memory (RAM), a Flash memory or a hard disk drive. The processing unit 16 is arranged to cause the tool 10 to carry out the method according to embodiments when the appropriate computer program 17 comprising computer-executable instructions is downloaded to the storage medium 18 and executed by the processing unit 16. The storage medium 18 may also be a computer program product comprising the computer program 17. Alternatively, the computer program 17 may be transferred to the storage medium 18 by means of a suitable computer program product, such as a Digital Versatile Disc (DVD) or a memory stick. As a further alternative, the computer program 17 may be downloaded to the storage medium 18 over a network. The processing unit 16 may alternatively be embodied in the form of a digital signal processor (DSP), an application specific integrated circuit (ASIC), a field-programmable gate array (FPGA), a complex programmable logic device (CPLD), etc.

As is understood, the control device 21 may be arranged inside the tightening tool 10 or in connection to the tool 10, for instance as a control device 21 attached to an external side of the main body 11 of the tool 10.

Further, the tool 10 comprises an in-built sensor 19 capable of measuring the torque applied to the bolt 20. The torque sensor 19 is in communication with the processing unit 16 such that the processing unit 16 may acquire the measured torque values.

As previously mentioned, for a given population of a tool, a few individual tools may require service before scheduled maintenance. This may require a tool to prematurely be taken out of production for maintenance, thereby causing interruptions and delay which typically is costly. In a more severe scenario, not only may the performance of the tool decrease thereby showing signs of requiring service; the tool may even stop functioning and have to be replaced.

This is resolved according to a method of detecting an indication of a tightening tool deteriorating in tightening performance according to embodiments to be described in the following.

Thus, with the method according to the embodiment to be described, for a population of tools, a statistical analysis/monitoring is undertaken to determine an appropriate maintenance schedule, and further to detect for one or more tools within the population an indication that the tool(s) likely needs maintenance before a service occasion being planned according to the determined maintenance schedule.

In other words, an objective is to detect an indication that performance of one or more tools in the population is deteriorating to such a degree that service is required. Advantageously, by detecting such indication before the performance of the tool deteriorates to an unacceptable level, or even stops functioning, a planned maintenance may be scheduled rather than a forced service interruption having to be undertaken.

To determine statistical properties of a tool, in the following exemplified in the form of the tightening tool 10 of FIG. 1 applying a torque to the bolt 20, the capability of the tool may be measured utilizing a capability test where a spread in a metric representing the capability of the tool is measured. In this particular example, the capability metric is represented by the torque that the tightening tool 10 applies to the bolt 20.

Hence, a number of tightening operations are performed by the tightening tool 10 where the torque applied to the bolt 20 is measured. As is understood, a specific calibration equipment may be used during the capability test for this purpose in order to operate the tightening tool 10 to apply the torque to the bolt 20 and measure the resulting, actually applied torque (i.e. the final torque) and possibly also an operational angle of the tool 10 with respect to the bolt 20.

As is understood, during the capability test of the tool 10 performed at a tool manufacturing stage, the tool 10 will typically present a low "textbook" spread, or else it will be subjected to service or even cassation; only fully functioning tools will pass the capability test and enter the production stage for normal operation of the tool.

Now, assuming that a specified target torque (TT) is to be applied by the tightening tool 10 to the bolt 20; the tightening tool 10 will then typically at some occasions apply a torque which slightly exceeds TT and at other occasions a torque which is slightly below TT (and at most occasions a torque which indeed coincides with TT), as measured by the torque sensor 19.

Even though the tool 10 optimally should apply the specified TT to the bolt 20 at all times, the actually applied torque will typically follow a normal distribution around TT. There are numerous reasons for this, for instance that the tightening tool 10 stops just before TT is reached, the tightening tool 10 stops just after TT is reached, the output shaft 13 of the tool 10 is not perfectly aligned with the bolt 20, etc. There is thus a spread in the torque being applied to the bolt 20 by the tool 10, which follows a normal distribution.

In an example, a capability measure (CM) may thus be computed as:

$$CM=(\text{torque\_limit\_high}-\text{torque\_limit\_low})/6*\sigma,$$

where torque_limit_high is an upper torque limit, usually 7-10% higher than TT, while torque_limit_low is a lower torque limit, usually 7-10% lower than the TT. The standard deviation in applied torque over the number of tightening operations being performed is denoted $\sigma$.

The CM gives an indication on the reliability of the tool; the lower the CM, the less reliable the tools is since a low CM indicates a high $\sigma$.

In other words, by measuring the spread of the actual torque applied to the bolt 20 by the tightening tool 10, an indication is given on the reliability of the tool 10. If the spread in torque is increasing, the performance of the tool 10 may be deteriorating, and it may be required to perform maintenance on the tool 10, even if the tool 10 currently is not scheduled for service.

In practice, the spread in torque applied to a bolt will follow a one-sided normal distribution rather than a regular two-sided normal distribution. This is because when the automated tightening tool 10 is operated to apply a desired TT to the bolt 20, the tool 10 is typically programmed to stop applying further torque when reaching the TT, and will thus occasionally overshoot the TT (but never, or at least very rarely, undershoot the TT).

Figure 2A:
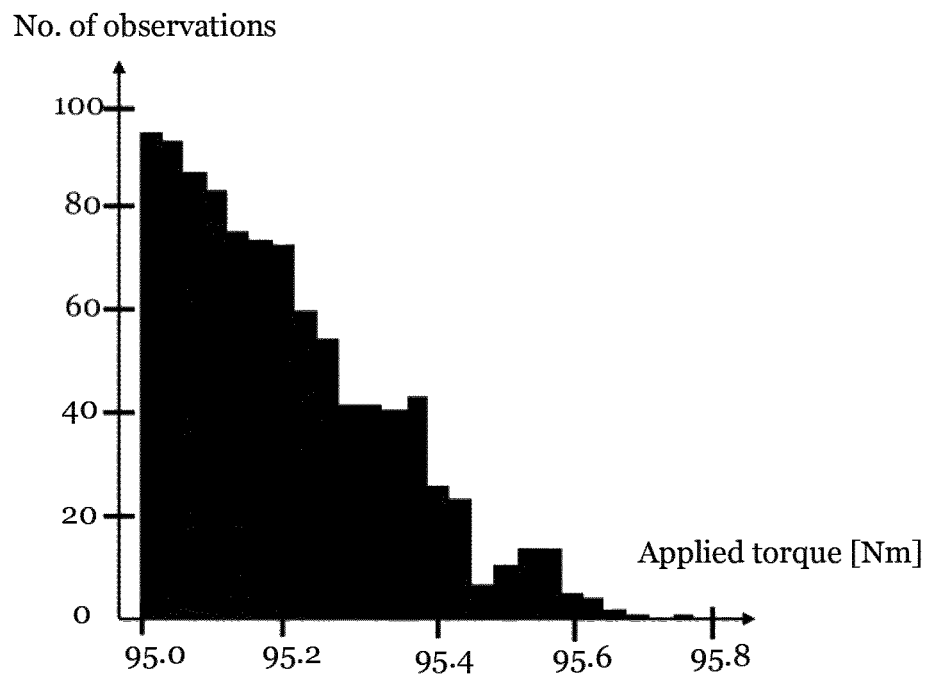
FIG. 2a illustrates a histogram for a one-sided normal distribution for observations of the applied torque of a tightening tool.

FIG. 2a illustrates a histogram of a one-sided normal distribution for observations of the applied torque of a fully functioning tool 10. As can be seen in FIG. 2a, the TT is 95 Nm and the overshoot in torque—i.e. the actually applied torque, also referred to as final torque—ranges up to just under 95.8 Nm.

It should be noted that also at a higher applied torque of 95.8 Nm as illustrated in FIG. 2a, the bolt tightening is correct and the applied torque is within an allowable range, albeit slightly above the TT of 95 Nm. This is commonly classified as an OK bolt tightening which well meets production requirements.

There is also a maximum torque that is allowed to be applied by the tool, say 100 Nm in this particular example, and a bolt tightening resulting in a torque exceeding that maximum torque of 100 Nm is not allowed. Typically, an operator of the tool would be informed by means of e.g. a warning such as a flashing red lamp, and would need to retighten the bolt. Such tightening is classified as a not ok (NOK) bolt tightening.

Figure 2B:
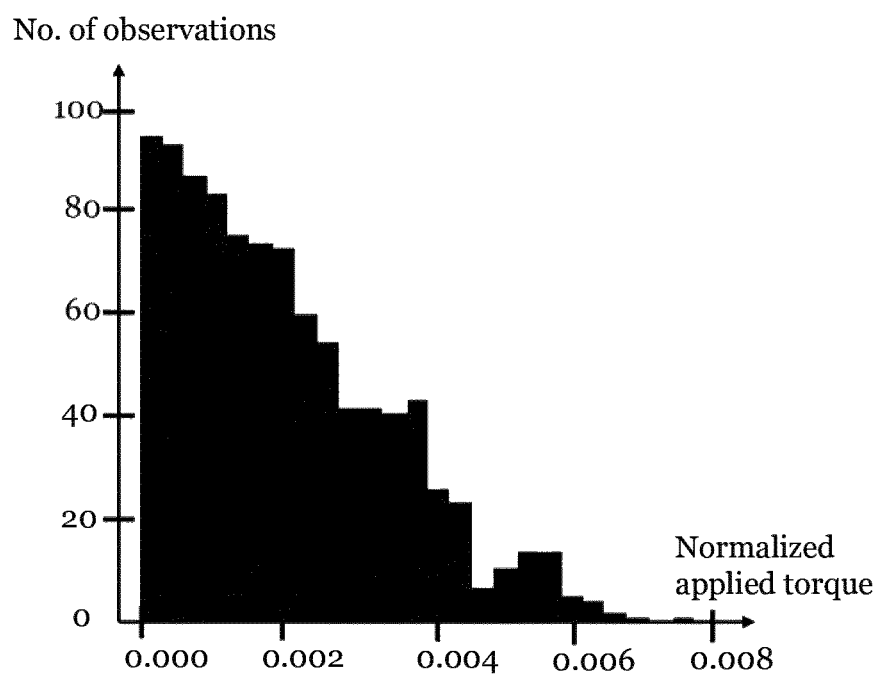
FIG. 2b illustrates the histogram of FIG. 2a where the observations of the applied torque has been normalized with a target torque and centred around zero.

In FIG. 2b, the histogram of the one-sided distribution of the applied torque of FIG. 2a has been normalized with the TT and centred around zero by subtracting 1, i.e. Xnorm=(X/TT)−1. Hence, in this representation, TT=0.000 while the overshoot in applied torque ranges up to just under 0.008.

An indication of a deterioration in the tightening performance of the tightening tool 10 may be detected by noting that the distribution of the observed torque values is moving in a right-hand direction in the graphs of FIGS. 2a and 2b.

This may either be a result of the average applied torque gradually increasing or the deviation in applied torque increasing, or both. Hence, an indication of a deterioration in the tightening performance of the tightening tool 10 may be detected by noting that an appropriate torque overshoot metric is increasing, e.g. that a mean or median of observed torque values is increasing and/or that a deviation (e.g. $\sigma$) in observed torque values is increasing.

Figure 2C:
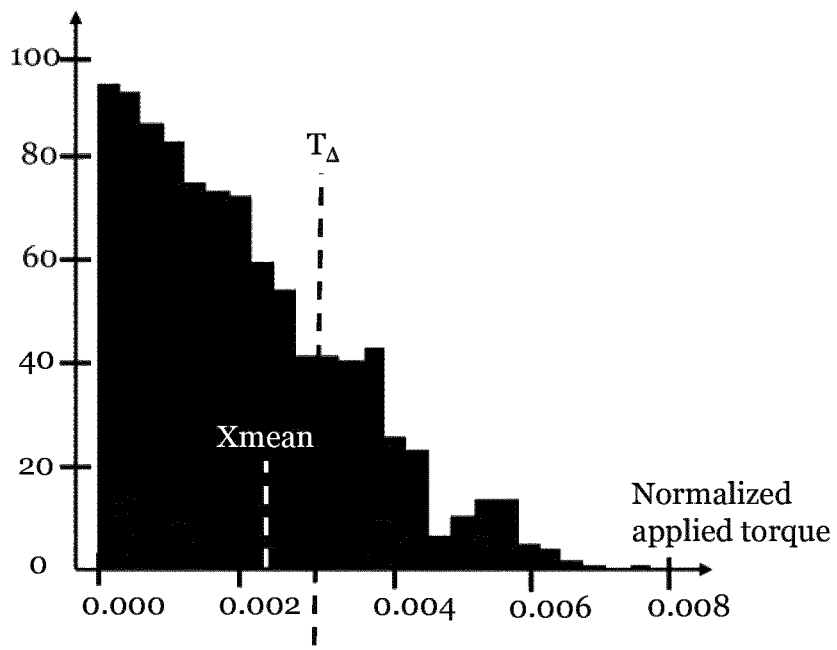
FIG. 2c illustrates the histogram of FIG. 2b with normalized mean value indicated as overshoot metric and an overshoot threshold value that must be exceed for an alert to be provided.

FIG. 2c illustrates the histogram of FIG. 2b, where a torque overshoot metric exemplified in the form of the mean value Xmean of all observed (normalized) applied torque values is at approximately 0.0024, while a predetermined torque threshold value $T_A$—being an indication of a maximum allowable torque mean value—in this example is set to 0.0029, that is allowed to be reached before an alert is provided that an indication of performance deterioration of the tightening tool 10 has been detected, according to some embodiments. However, this is still an OK tightening. In order to arrive at a NOK tightening of 100 Nm, the normalized mean value would have to increase to Xnorm=(100/95)−1.0=0.0526.

Figure 2D:
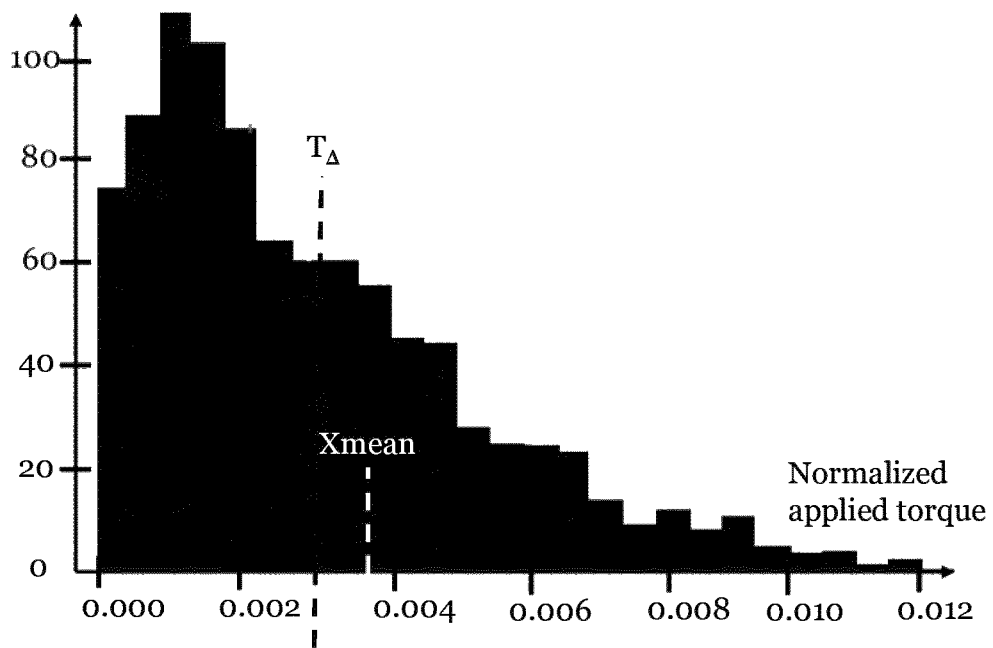
FIG. 2d illustrates a histogram for observations of the applied torque where the normalized mean value exceeds the overshoot threshold value.

With reference to FIG. 2d, upon detecting that the distribution of observed torque values has moved too far from the expected distribution as indicated by the overshoot metric, in this example the mean value Xmean of the normalized observed torque values, for instance being stipulated by the predetermined torque threshold value $T_A$ being exceed, an operator of the tightening tool 10 may be alerted, or the tool itself is alerted and automatically shuts down or enters an idle state. In a further example, a supervising entity, such as a control room, is alerted or the alert is provided to the remotely located cloud server 30 where an appropriate action is taken.

As seen in FIG. 2d, the normalized mean value Xmean of the observed torque values is no longer at 0.0024, but have increased to about 0.0036, thereby exceeding the predetermined torque threshold value $T_A$=0.0029.

Thus, if the overshoot in applied torque during normal operation of the tightening tool starts to deviate from the expected torque overshoot, an indication of a potentially faulty tool is considered to have been detected.

However, it should be noted that there are natural variations in the observations of the applied torque, and a situation where an operator is falsely alerted should be avoided. There is thus a need for ensuring that a deterioration in tool performance is detected on the one hand, while not falsely alerting an operator that service of the tool is required on the other.

As mentioned, there are numerous statistical torque parameters that may be considered indicating torque overshoot with respect to the ideally applied target torque TT, e.g. mean value, median value, standard deviation, etc., for detecting a deterioration in performance of the tool.

For example, the overshoot metric may be embodied by torque standard deviation $\sigma x$ for an observed set X of torque values of a tool, and if the deviation exceeds an expected deviation as stipulated by (and set by analysing) historical data, for instance by exceeding a given torque deviation threshold value $T_S$, the tool performance is considered to not meet performance requirements.

In another example, the overshoot metric may be embodied by torque mean value Xmean for an observed set X of torque values of a tool, and if the mean value exceeds a given torque mean threshold value $T_A$, the tool performance is considered to not meet performance requirements as illustrated in FIG. 2d.

Assuming for instance that when analysing statistical data for a population of the tool 10 being monitored, it is concluded that 8 out of 10 tools is regarded to not meet performance requirements $\sigma_x > T_S$. The value of $T_S$ may be adjusted depending on the particular industrial application and on the strictness the requirements and thus vary from one application to another.

Hence, for a tightening tool 10 to be monitored, a set of observed values for the torque applied to a bolt 20 is acquired, which set of observed torque values serves as a basis for detecting whether or not the performance of the tool is indicated to be deteriorating.

As seen in FIG. 1, the tightening tool 10 is equipped with a sensor 19 capable of measuring the torque applied to a bolt 20, wherein every time a bolt 20 is tightened the sensor 19 measures the torque being applied to the bolt 20 and stores the measured torque value locally in memory 18.

In embodiments, in line with the example given above with reference to FIGS. 2a-2d, the tool 10 may store the maximum allowed torque value of 100 Nm, where the display 14 may indicate with a flashing red lamp that the maximum torque of 100 Nm is exceeded resulting in a NOK tightening, which typically requires the operator of the tool 10 to retighten the bolt.

Further, a torque threshold value such as the torque mean threshold value $T_A$ is stored. Again with reference to FIGS. 2a-2d, such value would in this example correspond to a normalized applied torque of 0.0029 (corresponding to approximately 95.28 Nm), i.e. a torque value substantially lower than the maximum torque representing a NOK tightening.

Hence, the predetermined overshoot threshold value is set to have a value being in a predetermined range of allowable torque values that may be applied to the object to be tightened, i.e. a range being classified to represent OK tightenings.

In other words, and as will be described in much detail in the following, it may be envisaged that if an overshoot metric of observed torque values, in this case the average torque Xmean of a set X of applied torque values, exceeds a predetermined overshoot threshold value exemplified as $T_A$=95.28 Nm, an alert is provided to the operator.

As is understood, a bolt tightening with a torque of around 95.3 Nm is still a correct and allowed tightening satisfying production requirements, while a torque of 100 Nm must be applied for a NOK tightening to occur.

Nevertheless, an increase in Xmean up to 95.3 Nm (the TT is 95 Nm in this example) may be an indication that the applied torque slowly is increasing, and that tool maintenance may be required. Thus, with the method of embodiments described herein, an increasing trend in applied torque value may advantageously be detected at an early stage.

In this example, the predetermined overshoot threshold value $T_A$ is set to be approximately 0.3% higher than the target torque TT. This is exemplifying only and may depend on the particular application of the tool and strictness of safety regulations. However, while the predetermined overshoot threshold value $T_A$ typically is relatively close to TT, it is relatively far removed from the torque value, as indicated in the above example. That is, the method according to the embodiments described herein aims to detect any sign of tool maintenance being required long before the tightenings approaches the NOK torque value.

In practice, the tool may perform hundreds of tightening operations each day, and in the exemplifying embodiments discussed in the below, a set X of 100 observed torque values $x_1, x_2, \ldots, x_{100}$ will be recorded for each day over a series of days to detect tool performance deterioration.

Figure 3:
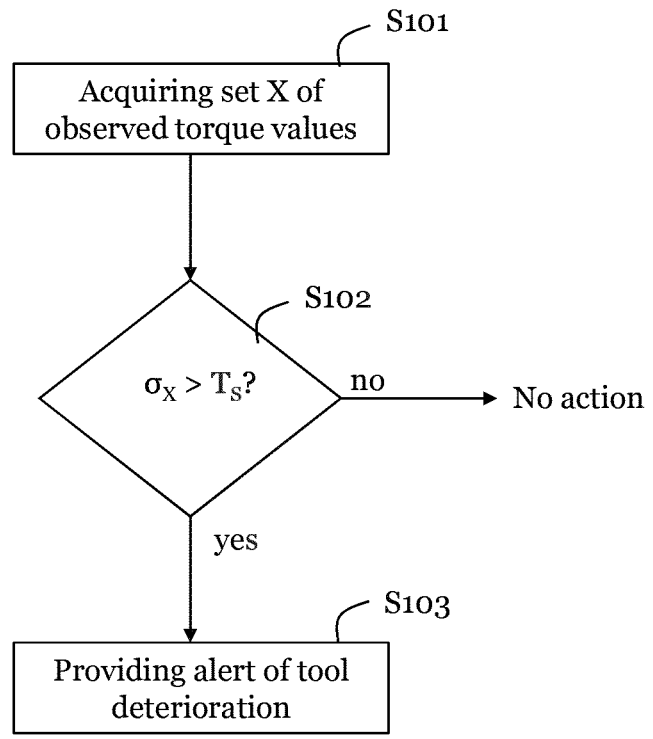
FIG. 3 shows a flowchart illustrating a method of detecting an indication of a tightening tool deteriorating in tightening performance according to an embodiment.

FIG. 3 illustrates a flowchart of a method of detecting an indication of a tightening tool deteriorating in tightening performance according to an embodiment.

In a first step S101, a set X of observed torque values is acquired for a tightening tool 10 to be monitored. For instance, a set X comprising, say, n=100 torque observations (i.e. $x_1, x_2, \ldots, x_{100}$) is acquired in order to attain a set which is large enough to form a reliable distribution. These observations may be recorded over a time period of e.g. 24 hours. Further, it may be envisaged that a set X in practice may comprise far more than 100 torque observations. Preferably, the number of torque observations should be of such an amount that a reliable distribution may be formed as illustrated in FIGS. 2a-d.

Thereafter, it is determined in step S102 whether or not an overshoot metric in the form of a standard deviation $\sigma_X$ computed for the observed values $[x_1, x_2, \ldots, x_{100}]$ exceeds the predetermined torque deviation threshold value $T_S$. If not, no action is taken since the observed torque values complies with expectations imposed on a fully functioning tool.

However, if the standard deviation $\sigma_X$ computed for the observed values $[x_1, x_2, \ldots, x_{100}]$ indeed exceeds the predetermined torque deviation threshold value $T_S$, an alert is provided that an indication of tightening tool deteriorating has been detected.

For instance, an operator of the tightening tool 10 may be informed via the display 14 that tool maintenance should be considered, possibly in combination with an audial alert.

It is envisaged that the tool 10 itself may perform steps S101-S103, or one or more of the steps S101-S103 may alternatively be performed solely by the cloud server 30 or by cooperation between the tightening tool 10 and the cloud server 30. As is understood, the cloud server 30 comprises circuitry corresponding to the control unit 21 comprising processing unit 16, computer program 17 and storage medium 18.

For instance, the torque values may be observed by the tool 10 which communicates the set X of observed values to the cloud server 30 in step S101, whereby the cloud server 30 determines whether or not $\sigma_X > T_S$ and provides an alert to the tool operator in step 103, possibly via the tool display 14.

Figure 4:
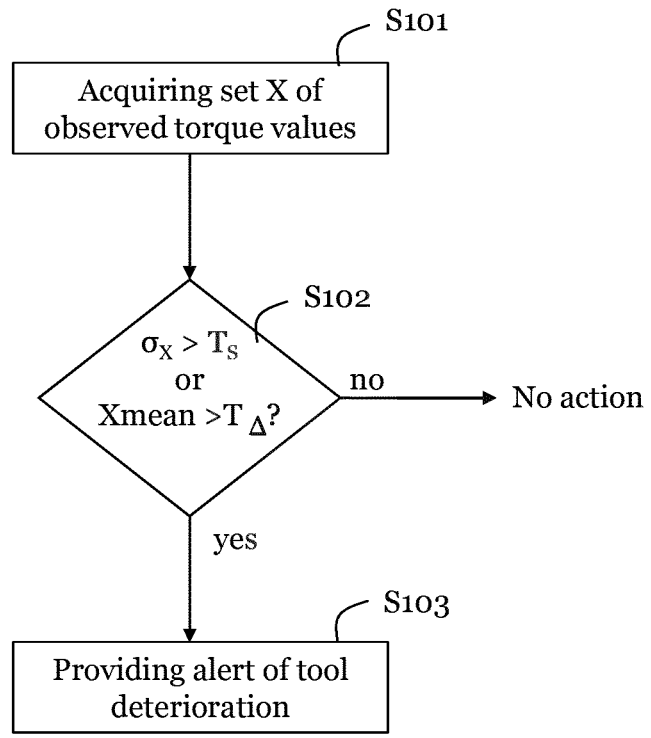
FIG. 4 shows a flowchart illustrating a method of detecting an indication of a tightening tool deteriorating in tightening performance according to an embodiment.

In a further embodiment illustrated with reference to the flowchart of FIG. 4, it is not only determined whether $\sigma_X > T_S$ but further whether a mean value Xmean of the observed values $[x_1, x_2, \ldots, x_{100}]$ exceeds the target torque TT by more than an allowed value $\Delta$. In other words, if the mean value of the torque values in X exceeds the previously discussed predetermined torque threshold value $T_A$, also referred to as an overshoot threshold value $T_A$, where $T_A = TT + \Delta$.

Thus, this particular embodiment takes both mean value and standard deviation into account in that if any one of these two overshoot metrics exceeds a predetermined threshold value $T_A$ and $T_S$, respectively, an indication of tool performance deterioration is detected. As mentioned, an alternative to use the mean value of the torque observations would be to use the median value In other words, even if the standard deviation $\sigma_X$ does not exceed $T_S$, an indication of tool deterioration will still be detected of the mean value Xmean of the observed values $[x_1, x_2, \ldots, x_{100}]$ exceed the overshoot threshold value $T_A$, thereby indicating a higher spread in torque values than expected (and allowed).

In an embodiment, any applied torque having a value exceeding the maximum torque value indicating a NOK tightening (exemplified as 100 Nm in the above example) is filtered from the set X of observed values. That is, any observed torque exceeding the NOK torque value will be discarded and not included in the set X. This is advantageous, since an individual and potentially faulty tightening (which may be caused by an operator incorrectly handling the tool) will not be included in the set, which serves to find an increasing trend in applied torque values.

Figure 5:
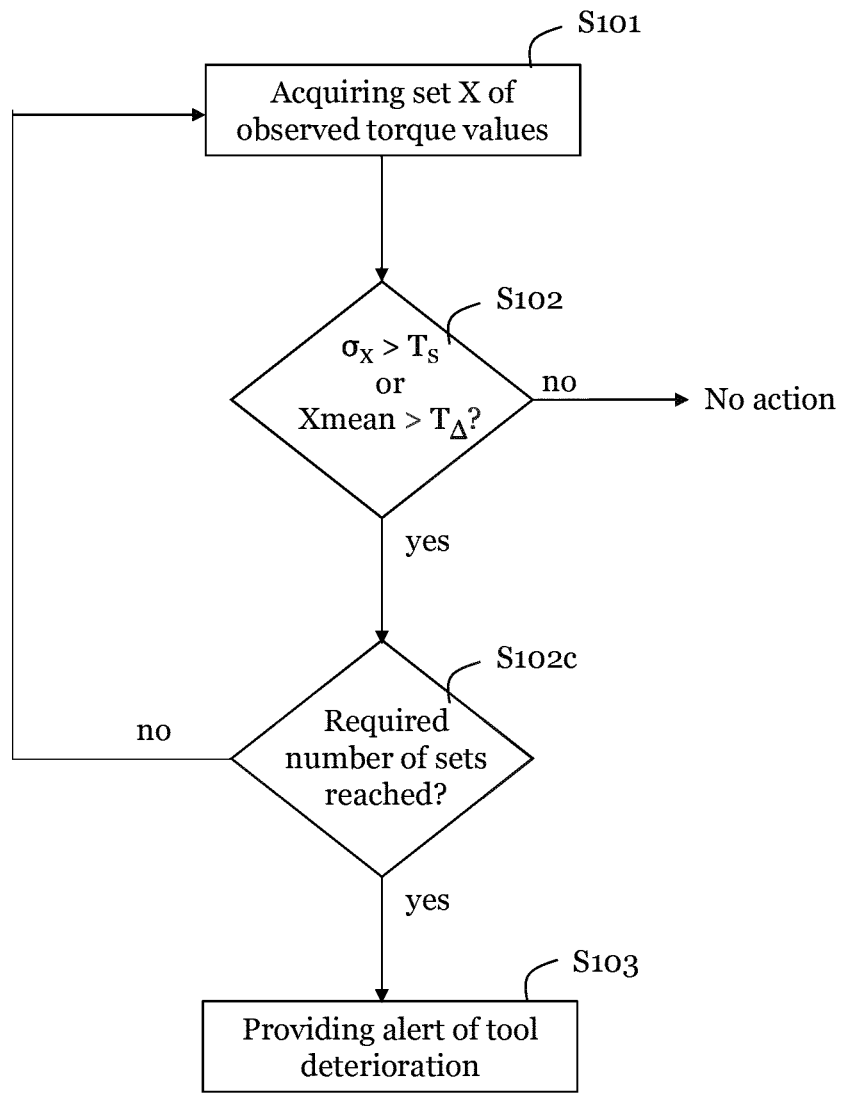
FIG. 5 shows a flowchart illustrating a method of detecting an indication of a tightening tool deteriorating in tightening performance according to an embodiment.

FIG. 5 illustrates a further embodiment where in order to avoid a situation where an operator is falsely alerted, it is required that at least one further acquired set X of observed torque values $[x_1, x_2, \ldots, x_{100}]$ is acquired as illustrated in step S102c. For instance, if the first set was acquired during a first day, a second set may be acquired during a second day and if also the second set of observed torque values complies with the spread condition stipulated in step S102, it is determined in step S102c that a required number of sets X of torque values $[x_1, x_2, \ldots, x_{100}]$ has been reached, wherein the alert is provided in step S103.

If the second set would not satisfy the conditions of $\sigma_X > T_S$ or Xmean>$T_A$ in step S102, no action is taken and the process would start over the next coming day.

As is understood, any number of sets X could be required in step S102c for the alert to be provided in step S103. For instance, it may be required that sets X of torque values are observed over three sequential days for the alert to be provided, given that the three sets X satisfy the overshoot conditions stipulated in step S102.

Figure 6:
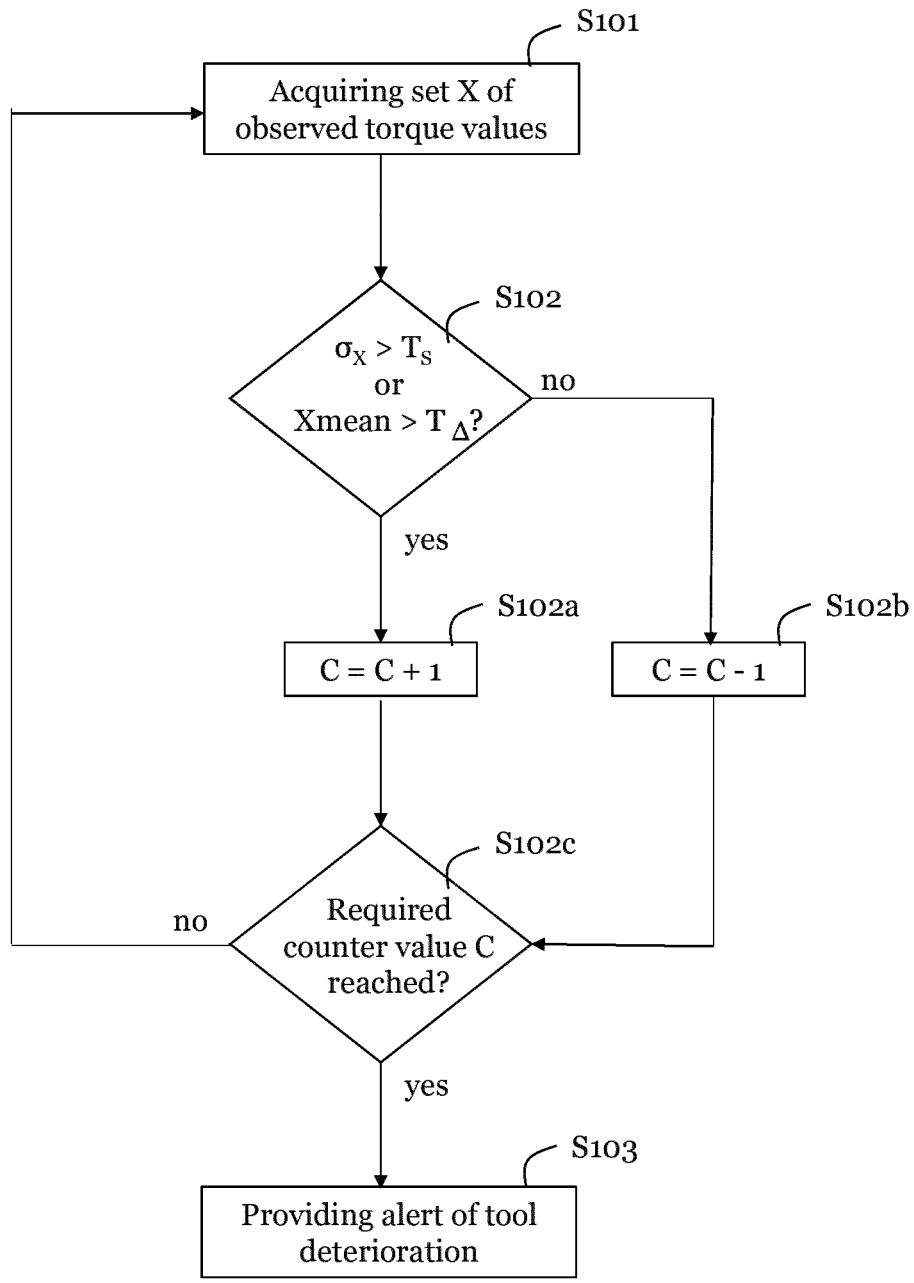
FIG. 6 shows a flowchart illustrating a method of detecting an indication of a tightening tool deteriorating in tightening performance according to an embodiment.

FIG. 6 illustrates still an embodiment, where if after a set X has been acquired in step S101 which comply with the overshoot conditions of step S102, a counter C is incremented (the counter value starts at zero and is not reduced below zero) from C=0 to C=1 in step S102a and it is determined whether or not a required number of sets X satisfying the overshoot conditions has been reached in step S102c. In this example, it is assumed that at least three sets X of observed torque values must satisfy the overshoot conditions of step S102 for an alert to be provided in step S103, while the counter at this stage only indicates C=1.

Therefore, a second set X is acquired during a following day in step S101 which is determined in step S102 to have the stipulated overshoot, whereby the counter C is incremented from C=1 to C=2 before it is determined in step S102c that the required number—i.e. three—of sets X has still not been reached.

A third set X of torque values is thus acquired in step S101 during a following third day. However, for this third set X, the overshoot conditions of step S102 are not complied with, having as an effect that the counter is decremented in step S102b from C=2 to C=1 and it is concluded in step S102c that further sets X must be acquired.

Accordingly, a fourth set X is acquired during yet a next following day which has the overshoot stipulated in step S102 and the counter is incremented from C=1 to C=2 in step S102a, which however is still not sufficient for providing an alert as determined in step S102c.

A fifth set X is thus acquired in step S101 during a fifth subsequent day, which further has the overshoot stipulated in step S102 and the counter is incremented from C=2 to C=3 in step S102a. As this point, the required number of sets have been reached in step S102c and an alert is indeed provided in step S103.

In a practical situation, it is difficult for an operator to detect small overshoots. Nevertheless, as discussed above, continuously occurring overshoots—albeit small—may eventually lead to an overshoot which no longer is considered small, even though still not necessarily near the NOK torque value.

After the required number of acquired sets X of observed torque values has satisfied the overshoot conditions, an alert is provided. With such an embodiment, it is possible to detect a deteriorating tool at an early stage.

Figure 7:
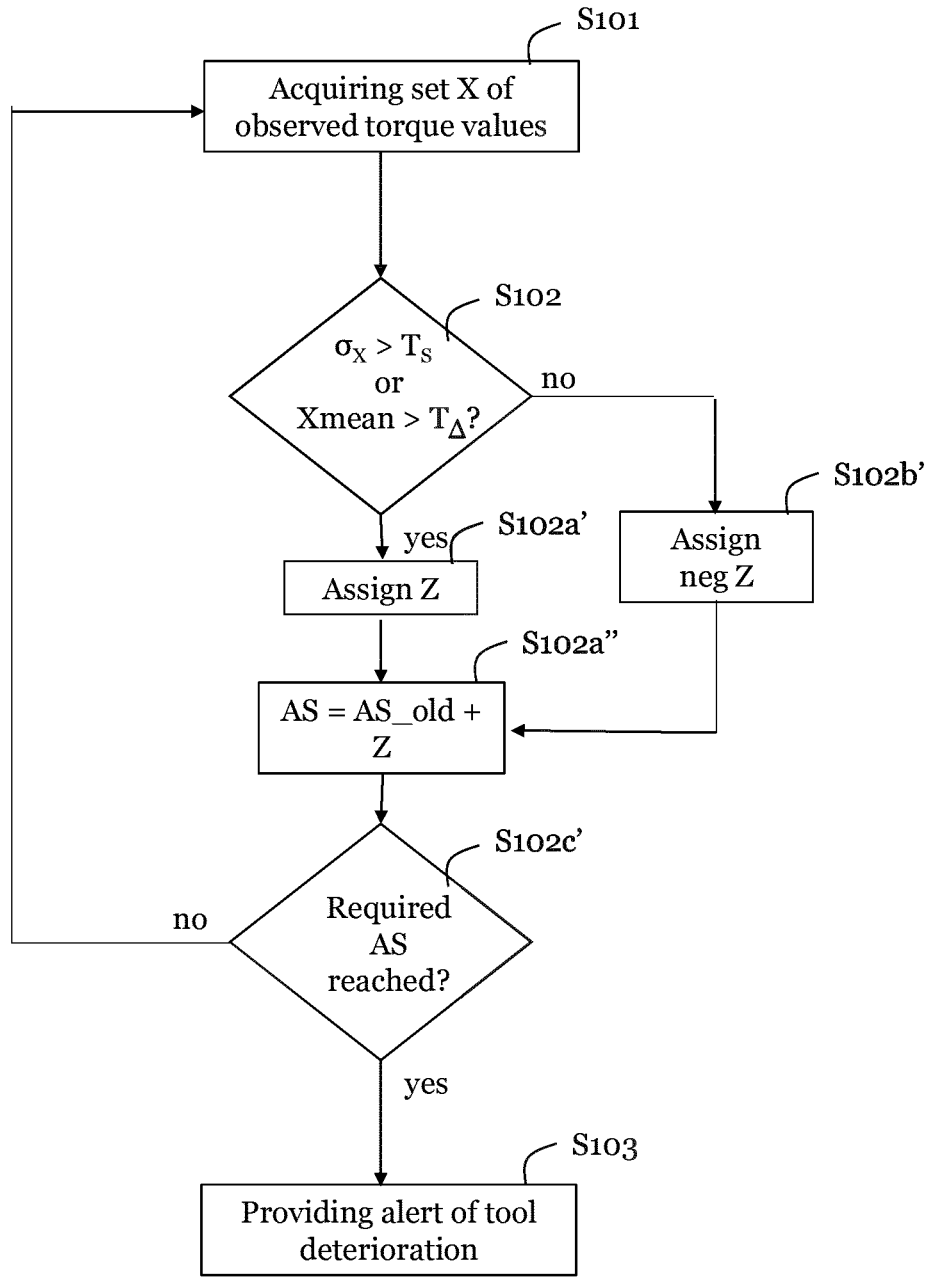
FIG. 7 shows a flowchart illustrating a method of detecting an indication of a tightening tool deteriorating in tightening performance according to an embodiment.

With reference to FIG. 7, in a further embodiment, rather than just concluding whether the overshoot conditions stipulated in step S102—i.e. $\sigma_X > T_S$ or $Xmean > T_A$—are complied with or not for a set X, a measure Z will be assigned to each evaluated set to indicate a degree of the overshoot of the set X of observed torque values with respect to the threshold values.

For instance, assuming that a first set X of observed torque values is acquired in step S101 and evaluated in step S102 and $\sigma_X >> T_S$ or $Xmean >> T_A$ for the first set X (which may be determined by an appropriate algorithm or by turning to a predetermined look-up table), then an overshoot measure Z of, say, 3.1 is assigned in step S102a'.

However, an indication of a tightening tool 10 deteriorating in performance will typically not show after a single day but will gradually deteriorate and it may take several days before it may be concluded that the deterioration indeed is occurring.

Therefore, any assigned overshoot measure Z is accumulated with previously assigned overshoot measures to earlier torque sets to form an anomaly score (AS) taking into account the gradual deterioration in step S102a". For a first iteration, there is no previous AS, i.e. AS_old, having been assigned. Therefore, AS_old=0 for the first iteration.

In step S102c', being an alternative to determining whether a required number of sets have been reached as previously described with reference to step S102c, it is determined whether a required AS is reached. Assuming that in this example the required AS is set to 3, then an alert is provided in step S103.

In this embodiment, a large overshoot for the acquired set X is penalized harder than a smaller overshoot.

In another example, if it e.g. is assumed that three consecutive sets X of torque values indeed comply with the overshoot conditions set forth in step S102, but that the mean value and/or the standard deviation is just over the threshold values for each set X (and also gradually increasing for each set), then the overshoot measure Z assigned to each set X in step S102a' during each iteration may be, say, 1.1, 1.2 and 1.3 resulting in an AS of 1.1+1.2+1.3=3.6 in step S102a" after the third set has been evaluated, wherein the required AS is reached in step S102c' and an alert is provided in step S103.

Hence, in this exemplifying embodiment, it would only require one single set X with a great overshoot to provide an alert in step S103, but three sets with smaller overshoot, since the overshoot measure Z being assigned in step S102a' to each set X gradually will be accumulated with the previously assigned overshoot values to form the AS in step S102a".

Further it may be envisaged that for a set X where the overshoot conditions of step S102 are not complied with, i.e. $\sigma_X \leq T_S$ or $Xmean \leq T_A$, a negative overshoot measure Z is assigned in step S102b' which is accumulated with the previous AS (i.e. AS_old) in step S102a". In other words, the assigned Z is effectively deducted from AS_old if $\sigma_X \leq T_S$ or $Xmean \leq T_A$.

In an example using the above numbers; if after two sets X have been evaluated and a current AS is 1.1+1.2=2.3, a third set is evaluated in step S102 where $\sigma_X \leq T_S$ or $Xmean \leq T_A$, resulting in a Z of e.g. −0.8 being assigned to the third set in step 102b' and a new AS being computed as AS=2.3−0.8=1.5 in step S102a".

If a fourth set is acquired being assigned a Z=1.3 in step S102a' acquired, the new AS is computed as AS=1.5+1.3=2.8 in step S102a", which subsequently requires a fifth consecutive set X complying with the overshoot conditions of step S102 to result in a new AS>3 as determined in step S102c' such that an alert can be provided in step S103.

In still an embodiment, an algorithm utilizing a so-called CUSUM ("cumulative sum") sequential analysis technique is implemented to detect tightening tool performance deterioration.

Figure 8:
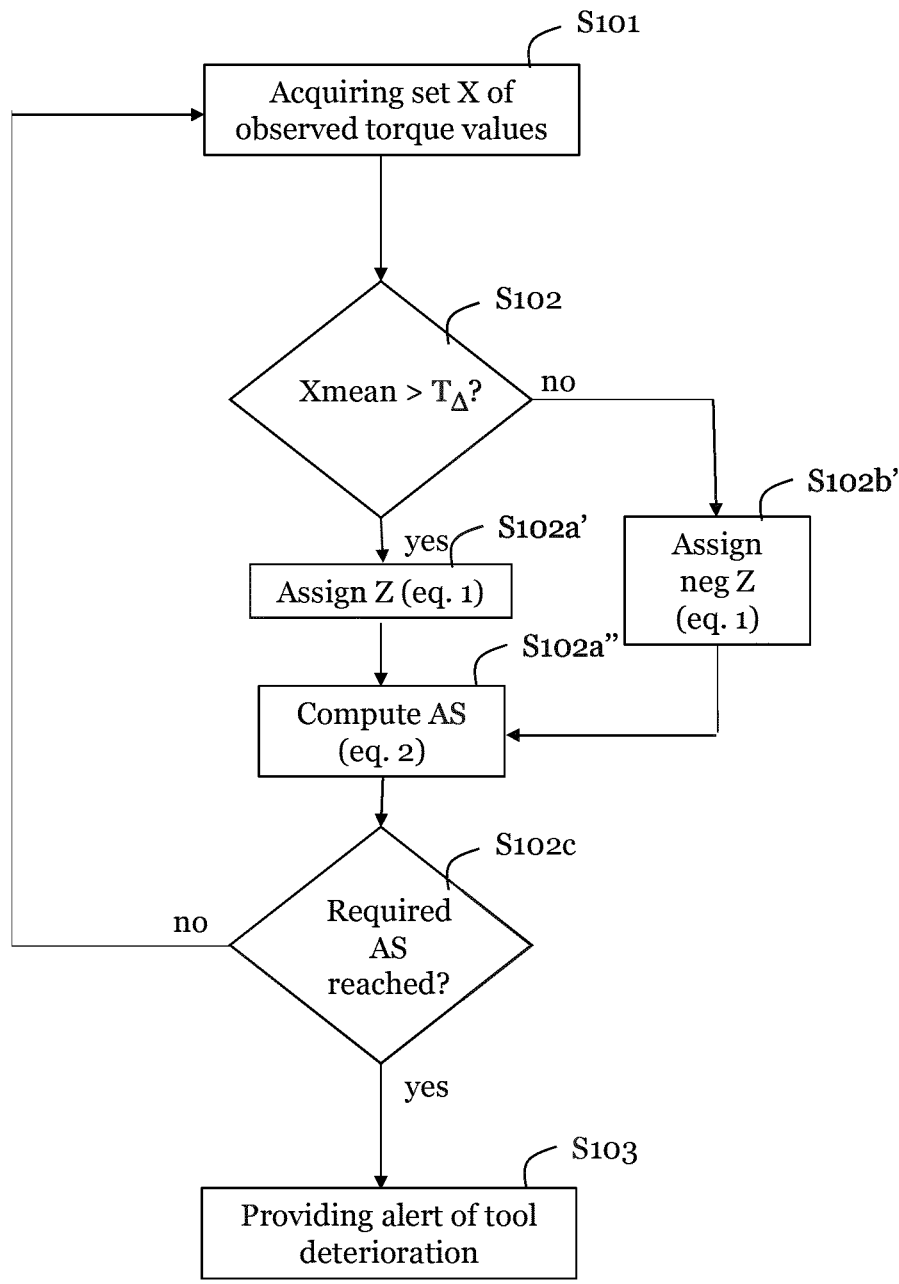
FIG. 8 shows a flowchart illustrating a method of detecting an indication of a tightening tool deteriorating in tightening performance according to an embodiment.

A flowchart of the method utilizing the CUSUM sequential analysis technique for detecting tightening tool performance deterioration is shown in FIG. 8.

In this embodiment, similar to previously discussed embodiments, a set X of observed torque values is acquired in step S101. Again, it is assumed that that set comprises 100 observed values [$x_1, x_2, \ldots, x_{100}$] taken over 24 hours.

Further, in step S102 it will again be determined whether or not an overshoot metric exceeds a threshold value. In this example, it is determined whether or not the mean value of a set X of torque values exceed the overshoot threshold value $T_A$.

In this embodiment, this will be implemented using equation (1):

$$Z_n = \frac{X_{mean} - T_\Delta}{c \times T_\Delta} \quad (1)$$

where $T_\Delta$ is the predetermined threshold value previously discussed for observed torque values based on historical data as previously discussed while c is a constant determining a magnitude with which a subsequently computed AS increases or decreases. Again, these are selected to find a balance between ensuring that a deterioration in tool performance is detected on the hand, while not falsely alerting an operator that service of the tool is required on the other. This may be based on the previously described CM which gives an indication on the reliability of the tool; the lower the CM, the less reliable the tools is since a low CM indicates a high σ. Hence, the CM and corresponding σ may serve as a basis for determining overshoot threshold values using approaches such as SVMs (support vector machines) or GMM (Gaussian mixture modelling).

In the following exemplifying embodiment, it is determined that $T_A=0.011$ while c=0.0136 from a study of collected historical torque data.

Further, in equation (1), all parameters used are normalized with the target value TT and the mean values utilized have been centred around zero by means of subtraction with 1 as discussed with reference to FIG. 2b.

Table 1 in the below illustrates normalized mean overshoot computed for the registered torque values [$x_1$, $x_2$, ..., $x_{100}$] during a sequence of days.

TABLE 1

Normalized mean overshoot computed for torque values registered over five subsequent days.

| Observation period | Normalized mean overshoot (Xmean) |
|---|---|
| Day 1 | 0.012 |
| Day 2 | 0.010 |
| Day 3 | 0.013 |
| Day 4 | 0.013 |
| Day 5 | 0.014 |

Now, with equation (1), the overshoot measure Z will be a positive value if Xmean exceeds $T_A$, i.e. if it is determined in step S102 that Xmean indeed exceeds the allowed overshoot threshold value $T_A$, thereby indicating a higher overshoot in torque values than expected (and allowed).

Thereafter, similar to previous embodiments, the overshoot measure Z is assigned to the set X of observed torque values in S102a', the difference being that Z is computed using equation (1).

Thereafter, the anomaly score AS reflecting a gradual deterioration of the tool 10 is computed in S102a".

In this embodiment, the AS will be computed using equation (2):

$$AS_{n+1} = \max(0, AS_n + Z_n) \quad (2)$$

So, for the normalized mean overshoot Xmean for day 1, with reference to the normalized overshoot values of Table 1 and equation (1) hereinabove; $Z_1$=(0.012−0.011)/0.136*0.011=0.667 as computed in step S102a'.

Applying this computed value in equation (2) yields $AS_1$=max (0, 0+0.667)=0.667 in step S102a". Initially, $AS_0$ is set to zero.

In this particular example, an AS of 4 must be reached in step S102c for an alert to be provided in step S103. Since that is not case after day 1, the observed torque values of day 2 will be considered. It is noted that in practice, $AS_1$ may be computed at the very end of day 1, and torque values of day 2 will be considered after another 24 hours.

Table 2 in the below illustrates values emanating for each iteration performed in the flowchart of FIG. 7.

TABLE 2

Normalized mean overshoot and anomaly score AS computed for torque values registered over five subsequent days.

| Observation period | Normalized mean overshoot (Xmean) | $Z_n$ | $AS_n$ |
|---|---|---|---|
| Day 1 | 0.012 | 0.667 | $AS_1$ = max(0, 0 + 0.667) = 0.667 |
| Day 2 | 0.010 | −0.667 | $AS_2$ = max(0, 0.667 − 0.667) = 0 |
| Day 3 | 0.013 | 1.33 | $AS_3$ = max(0, 0 + 1.33) = 1.33 |
| Day 4 | 0.013 | 1.33 | $AS_4$ = max(0, 1.33 + 1.33) = 2.66 |
| Day 5 | 0.014 | 2 | $AS_5$ = max(0, 2.66 + 2) = 4.66 |

As can be concluded from Table 2, for day 2, it is determined in step S102 that Xmean does not exceed the overshoot threshold value $T_A$, which results in a negative Z being assigned in step S102b' and which renders a decrease in the computed $AS_2$ in step S102a". However, the normalized mean overshoots Xmean of the three following days, i.e. day 3, day 4 and day 5, all exceed the overshoot threshold value $T_A$, resulting in a gradual increase of the computed AS which ultimately will exceed the threshold value AS=4 after day 5 and an alert is provided accordingly in step S103.

As is understood, once the required AS has been reached and a tool maintenance session is performed, a reset is performed such that the tool 10 starts with an AS of zero once it is taken into operation again.

In an embodiment, the alert further comprises an indication of time having elapsed since a last tool maintenance session was performed and/or how many tightening operations have been performed by the tightening tool 10 since a last tool maintenance session was performed.

In yet an embodiment, if the number of tightenings performed during a day is too few to serve as a basis for determining spread with statistical significance, the operator may be informed accordingly by the tool 10. For instance, if 100 observations are required for each set and only 50 tightenings have been performed at the end of a day, the operator is informed accordingly.

Figure 9:
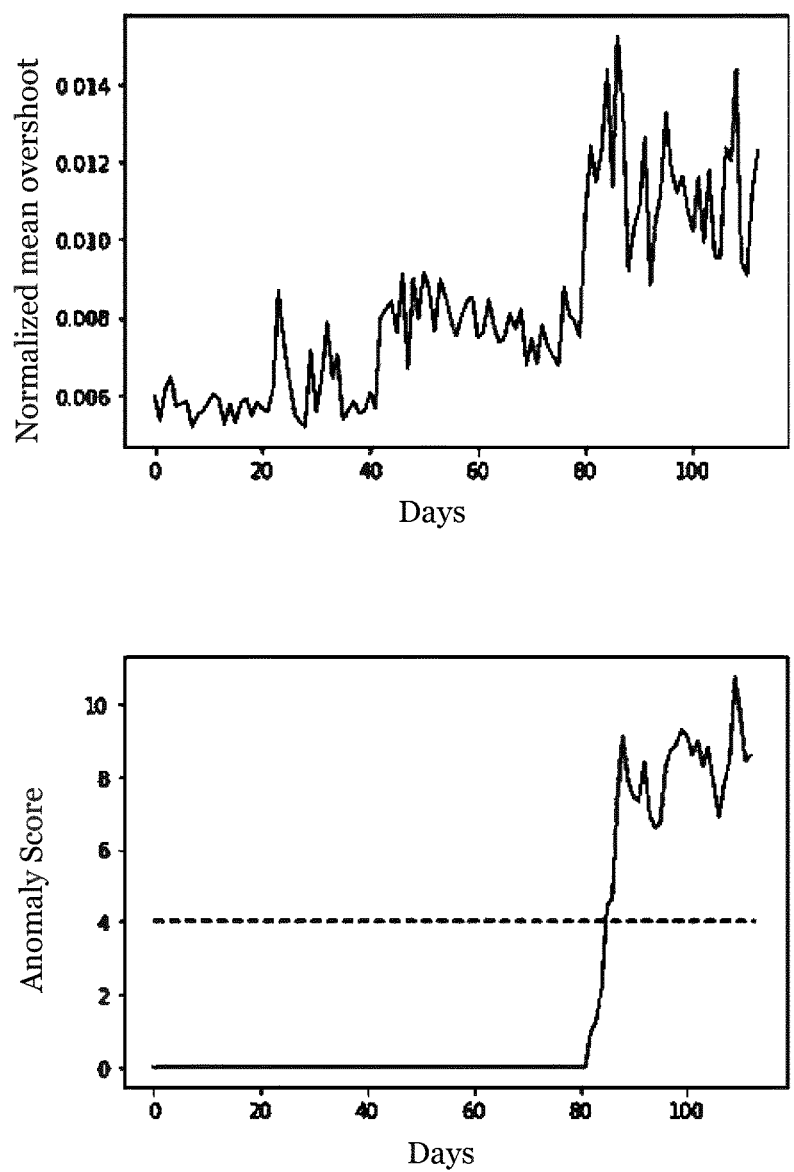
FIG. 9 illustrates an increase in a spread metric of a tool and a corresponding increase in anomaly score.

FIG. 9 illustrates a realistic scenario where, as can be seen in an upper diagram, the overshoot metric (in this case normalized mean overshoot) of the tightening tool 10 is fairly coherent up until around day 80 where the overshoot metric starts to increase.

As a result, as can be seen in a lower diagram, the computed anomaly score AS rapidly increases above the required value of 4, and an alert is provided. As can be seen, as long as the overshoot metric of the observed torque values in the acquired sets does not exceed the predetermined overshoot threshold value, the AS is zero. This is because in such case, the assigned overshoot measure Z for each set is negative and a boundary condition for the AS is that the score cannot fall below zero.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method for detecting an indication of a tightening tool deteriorating in tightening performance executed by one or more control devices comprising:
   (a) acquiring, via one or more torque measurement sensors, at least one set of observed values of a final torque having been applied by the tightening tool to an object to be tightened over a first time period;
   (b) determining whether or not an overshoot metric of the observed values in the at least one acquired set with respect to a target torque exceeds a predetermined overshoot threshold value, wherein the predetermined overshoot threshold value is set to have a value being in a predetermined range of allowable torque values that may be applied to the object to be tightened, said predetermined range of allowable torque values being classified to represent OK tightenings, the range being lower than a maximum allowable torque value classified to represent not OK, NOK, tightenings; and if so
   (c) providing an alert to at least one of an indicator associated with the tightening tool or to a remote computing system that an indication of performance deterioration of the tightening tool has been detected and that maintenance of tool may be needed; and
   (d) repeating at least operations (a) and (b) over a subsequent time period, if the predetermined range of allowable torque values being classified to represent OK tightenings.

2. The computer-implemented method according to claim 1, the overshoot metric comprising one or more of a mean value of the observed torque values in the set, standard deviation of the observed torque values in the set or median value of the observed torque values in the set.

3. The computer-implemented method according to claim 1, further comprising:
   acquiring at least one further set of observed values of a torque having been applied by the tightening tool to an object to be tightened over a second subsequent time period;
   determining whether or not the overshoot metric of the observed values in the at least one further acquired set exceeds the predetermined overshoot threshold value;
   determining whether or not a required number of acquired sets has been reached where the overshoot metric exceeds the predetermined overshoot threshold value; and if so
   providing the alert that an indication of performance deterioration of the tightening tool has been detected.

4. The computer-implemented method according claim 3, further comprising:
   incrementing a counter each time the overshoot metric of the observed values in an acquired set is determined to exceed the predetermined overshoot threshold value for determining if the required number of acquired sets has been reached.

5. The computer-implemented method according claim 4, further comprising:
   decrementing the counter each time the overshoot metric of the observed values in an acquired set is determined not to exceed the predetermined overshoot threshold value for determining if the required number of acquired sets has been reached.

6. The computer-implemented method according to claim 1, further comprising:
   assigning a measure to each acquired set of observed values indicating a degree of overshoot of the set of observed torque values with respect to the predetermined overshoot threshold value.

7. The computer-implemented method according to claim 6, further comprising:
   accumulating the assigned measure indicating a degree of overshoot of a currently acquired set with the measure indicating a degree of overshoot assigned to an immediately preceding acquired set to form an anomaly score, where for each subsequent set the assigned measure indicating a degree of overshoot is recursively accumulated with the anomaly score; and
   determining whether or not a required anomaly score has been reached; and if so providing the alert that an indication of performance deterioration of the tightening tool has been detected.

8. The computer-implemented method according to claim 7, wherein for each acquired set where the overshoot metric of the observed values is determined not to exceed the predetermined overshoot threshold value, the overshoot measure is assigned as a negative number, with a boundary condition that a minimum value of the anomaly score is zero.

9. The computer-implemented method according to claim 1, wherein the alert is provided to an operator of the tightening tool, to the tightening tool itself, to a supervision control room or to a remote cloud function.

10. The computer-implemented method according to claim 9, wherein the tightening tool provides an audible and/or visual alert to the operator of the tool.

11. The computer-implemented method according to claim 9, the alert further being configured to comprise an indication of time since a last tool maintenance session was performed and/or how many tightening operations have been performed by the tightening tool since a last tool maintenance session was performed.

12. The computer-implemented method according to claim 1, further comprising:
   discarding any observed torque value classified as a not OK tightening from said at least one set.

13. A computer program product stored on a non-transitory computer-readable medium, said computer program product for detecting an indication of a tightening tool deteriorating in tightening performance, for wherein said computer program product comprising computer instructions to cause one or more control devices to perform the following operations:
   (a) acquiring, via one or more torque measurement sensors, at least one set of observed values of a final torque having been applied by the tightening tool to an object to be tightened over a first time period;
   (b) determining whether or not an overshoot metric of the observed values in the at least one acquired set with respect to a target torque exceeds a predetermined overshoot threshold value, wherein the predetermined overshoot threshold value is set to have a value being in a predetermined range of allowable torque values that may be applied to the object to be tightened, said predetermined range of allowable torque values being classified to represent OK tightenings, the range being lower than a maximum allowable torque value classified to represent not OK, NOK, tightenings; and if so
   (c) providing an alert to at least one of an indicator associated with the tightening tool or to a remote computing system that an indication of performance deterioration of the tightening tool has been detected and that maintenance of tool may be needed; and (d) repeating at least operations (a) and (b) over a subsequent time period, if the predetermined range of allowable torque values being classified to represent OK tightenings.

14. A control device configured to detect an indication of a tightening tool deteriorating in tightening performance, the control device comprising a processing unit and a memory, said memory containing instructions executable by said processing unit, whereby the control device is operative to:

(a) acquire, via one or more torque measurement sensors, at least one set of observed values of a final torque having been applied by the tightening tool to an object to be tightened over a first time period;

(b) determine whether or not an overshoot metric of the observed values in the at least one acquired set with respect to a target torque exceeds a predetermined overshoot threshold value, wherein the predetermined overshoot threshold value is set to have a value being in a predetermined range of allowable torque values that may be applied to the object to be tightened, said predetermined range of allowable torque values being classified to represent OK tightenings, the range being lower than a maximum allowable torque value classified to represent not OK, NOK, tightenings; and if so (c) provide an alert to at least one of an indicator associated with the tightening tool or to a remote computing system that an indication of performance deterioration of the tightening tool has been detected and that maintenance of tool may be needed; and (d) repeat at least operations (a) and (b) over a subsequent time period, if the predetermined range of allowable torque values being classified to represent OK tightenings.

15. The control device according to claim 14, wherein the control device is arranged inside or in connection to the tool or being a control device located remotely from, and in communication with, the tightening tool.

* * * * *